United States Patent
Coney et al.

(10) Patent No.: US 6,817,185 B2
(45) Date of Patent: Nov. 16, 2004

(54) ENGINE WITH COMBUSTION AND EXPANSION OF THE COMBUSTION GASES WITHIN THE COMBUSTOR

(75) Inventors: Michael Willboughby Essex Coney, Swindon (GB); Hicham Salah Abdallah, Swindon (GB); Roger Richards, Henfield (GB)

(73) Assignee: Innogy PLC, Wiltshire (GB)

( * ) Notice: Subject to any disclaimer, the term of this patent is extended or adjusted under 35 U.S.C. 154(b) by 0 days.

(21) Appl. No.: 10/240,393

(22) PCT Filed: Mar. 30, 2001

(86) PCT No.: PCT/GB01/01456

§ 371 (c)(1),
(2), (4) Date: Sep. 30, 2002

(87) PCT Pub. No.: WO01/75290

PCT Pub. Date: Oct. 11, 2001

(65) Prior Publication Data

US 2003/0049139 A1 Mar. 13, 2003

(30) Foreign Application Priority Data

Mar. 31, 2000 (GB) ............................................. 0007917

(51) Int. Cl.[7] ................................................ F02C 1/00
(52) U.S. Cl. ...................... 60/772; 60/39.511; 60/39.53
(58) Field of Search ............................. 417/243; 60/772, 60/39.52, 39.53, 39.55, 39.12, 39.18, 39.511, 783, 774, 775, 618, 730

(56) References Cited

U.S. PATENT DOCUMENTS

| 4,041,708 A | * | 8/1977 | Wolff | .......................... 60/649 |
|---|---|---|---|---|
| 4,478,553 A | * | 10/1984 | Leibowitz et al. | ......... 416/97 R |
| 4,996,845 A | | 3/1991 | Kim | ............................. 60/618 |
| 5,771,693 A | * | 6/1998 | Coney | .......................... 60/407 |
| 5,809,981 A | | 9/1998 | Berg-Sonne | ................ 123/563 |
| 5,839,270 A | * | 11/1998 | Jirnov et al. | .................. 60/775 |
| 6,178,735 B1 | * | 1/2001 | Frutschi | ....................... 60/772 |

FOREIGN PATENT DOCUMENTS

| EP | 0 492 272 A | 7/1992 |
|---|---|---|
| GB | 1 308 436 A | 3/1991 |
| WO | WO 93/24754 A2 | 12/1993 |
| WO | WO 94/12785 A | 6/1994 |
| WO | WO 98/16741 A | 4/1998 |
| WO | WO 99/40379 A | 8/1999 |

* cited by examiner

*Primary Examiner*—Charles G. Freay
(74) *Attorney, Agent, or Firm*—Birch, Stewart, Kolasch & Birch, LLP (57) ABSTRACT

An engine comprising an isothermal air compressor (1) into which liquid is sprayed as the air is compressed. A combustion chamber (4) receives and expands the compressed air from which the liquid has been removed, to generate power. A precompressor (21, 27) compresses the air upstream of the isothermal compressor. The compressed air from the isothermal compressor receives heat from the exhaust gas from the combustion chamber in a primary heat exchanger (3). A secondary heat exchanger (31, 45) transfers heat recovered from a part of the engine to the compressed air from the isothermal compressor (1) upstream of the primary heat exchanger (3).

49 Claims, 5 Drawing Sheets

ENGINE WITH COMBUSTION AND EXPANSION OF THE COMBUSTION GASES WITHIN THE COMBUSTOR

This application is the national phase under 35 U.S.C. § 371 of PCT International Application No. PCT/GB01/01456 which has an International filing date of Mar. 30, 2001, which designated the United States of America.

The present invention relates to an engine comprising a positive displacement isothermal air compressor provided with a liquid spray to spray liquid into the air as it is compressed so that the compression is substantially isothermal; a combustion chamber in which the compressed air is expanded to generate power; means to feed the compressed air from the isothermal compressor to the combustion chamber; a separator to remove liquid from the compressed air upstream of the combustion chamber; a primary heat exchanger for transferring heat from exhaust gas from the combustion chamber to compressed air upstream of the combustion chamber; a precompressor to compress the air upstream of the isothermal compressor; and means to feed the air from the precompressor to the isothermal compressor.

Such an engine, which will subsequently be referred to as "of the kind described", is disclosed in WO 94/12785.

A different heat engine is disclosed in U.S. Pat. No. 5,839,270. In this engine, ambient air is fed directly to the sliding-blade compressor. Water is sprayed into the air during compression to ensure that the process is generally isothermal. The mixture of water and compressed air is then fed to a separator where the water and air are separated. Some of the air is then fed to a combustion chamber where fuel is injected and the fuel/air mixture is burned. Combustion gas is then fed to a separate expander where it is adiabatically expanded to perform useful work and also to drive the compressor. The exhaust gas from the expander is fed to a recuperator in which it preheats the remainder of the cool compressed air from the separator. The preheated compressed air mixes with the cool compressed air in the combustion chamber. In one example, the expander is cooled by water from the separator. The warmed water leaving the expander is then fed to a boiler which is used to generate steam to provide useful work in a steam expander. Thus, this document does not disclose a combustion chamber in which the compressed air is expanded, nor does it disclose a precompressor, or a means to feed air from the precompressor to the isothermal compressor. This is therefore not an engine of the kind described.

In order to recover heat from the combustion chamber in WO 94/12785 a fraction of the compressed air from the separator is heated by passing it through a cooling jacket surrounding the combustion chamber. This heated compressed air is then expanded in a cylinder in order to do useful work. However, the temperature of the coolant is necessarily limited to that which the materials and/or the lubrication oil of the combustor can withstand. The amount of heat that can be absorbed in the cooling jacket per unit mass of compressed air is therefore quite small. In order to recover this heat, a considerable amount of extra compression work is required from the isothermal compressor, thereby reducing the benefit of the heat recovery.

According to a first aspect of the present invention, an engine of the kind described is characterised by a secondary heat exchanger provided to transfer heat recovered from a part of the engine to the compressed air from the isothermal compressor upstream of the primary heat exchanger.

The present invention therefore offers a more efficient heat recovery process than that disclosed in WO 94/12785 because it makes more economical use of the air that is compressed. This saves compression work and increases the overall efficiency. The present invention recovers heat from a part of the engine and uses this to preheat the compressed air produced by the isothermal compressor. Unlike the invention described in WO 94/12785, no additional air needs to be compressed in order to recover this heat. Furthermore, unlike WO/12785, the present invention does not need to have a separate expansion chamber for the expansion of air used to recover the additional heat.

The heat recovered by the secondary heat exchanger may be recovered from any part of the engine including the exhaust gas. In this latter case, if the precompressor is arranged to be driven by the exhaust gas, for example by means of a turbine or other form of expander, the temperature of the exhaust gasses which have been used to drive the precompressor may still be high enough that heat can be recovered at the secondary heat exchanger from these gasses. However, it is primarily intended to recover heat from the combustion chamber, which passes into a combustion chamber cooling system, and/or from the air which is compressed by the precompressor.

For the most efficient engine cycle, heat should be recovered from both the combustion chamber and from the air from the precompressor. In this case, the secondary heat exchanger comprises a precompressor heat exchanger and a combustion chamber heat exchanger connected in parallel, and wherein the compressed air from the isothermal compressor is split into two streams, one stream being fed to the precompressor heat exchanger to receive heat from air from the precompressor, and the other stream being fed to the combustion chamber heat exchanger to receive heat from the combustion chamber; the engine further comprising means to control the split of the flow of air from the isothermal compressor into the two streams.

The advantage of providing two heat exchangers in parallel, each of which recovers heat from a separate component of the engine, lies in the fact that the range of temperature of the heat available from the separate components is broadly similar, but can vary according to engine load. A series arrangement presupposes that one heat source is consistently at a significantly higher temperature than the other. This is not the case with the heat from the precompressor and the heat from the engine cooling system, since both produce heat over overlapping temperature ranges. A parallel arrangement is more flexible in this situation.

Also, in spite of the reduced air flow in each of the parallel flow paths, it is still possible to provide sufficient capacity to absorb most of the available heat by adding water to the compressed air entering the secondary heat exchanger in a quantity which will be vaporised in the secondary heat exchanger. The high latent heat evaporation of water allows a considerable amount of heat to be absorbed by a small amount of water. The benefit of the evaporated water is that it provides additional working fluid to the engine, which is gained without any additional compression work. This results in a higher engine efficiency and a higher power output. It is generally found that the optimum cycle efficiency is achieved if the system is configured to maximise the total enthalpy of water vapour which is produced upstream of the primary heat exchanger. Carryover of excess liquid water into the primary heat exchanger is generally found to be detrimental to the cycle efficiency, although it may benefit the power output.

Adding the liquid to the compressed air creates a two-phase stream. It is difficult to control the composition of such a stream when the stream is distributed amongst a number of heat exchange elements within the secondary heat exchanger. Therefore, preferably, when the secondary heat exchanger has a number of heat exchange elements carrying the compressed air, the liquid is directly injected into each element. This allows direct control of the phase composition throughout the heat exchanger.

The liquid may be taken from any source. However, it is most conveniently taken from the separator.

When heat is recovered from both the air from the precompressor and the combustion chamber, liquid is preferably supplied to each of the compressed air streams in the precompressor heat exchanger and combustion chamber heat exchanger respectively. In this case, the engine further comprises means to control the flow of liquid to the precompressor heat exchanger and combustion chamber heat exchanger.

The streams from the precompressor and combustion chamber heat exchangers may be fed separately into the primary heat exchanger. However, they are preferably combined upstream of the primary heat exchanger.

Preferably, the engine comprises a coolant circuit containing liquid which extracts heat from the combustion chamber and transfers the heat in the secondary heat exchanger to the compressed air. When the secondary heat exchanger comprises a precompressor heat exchanger and a combustion chamber heat exchanger as described above, the coolant circuit will, of course, transfer its heat in the combustion chamber heat exchanger.

The use of the liquid coolant provides a more efficient cooling of the combustion chamber than the compressed air of the prior art, thereby allowing the power of the engine to be increased.

The liquid in the coolant circuit may be unpressurized. However, in order to prevent boiling, which would degrade heat transfer and cause local overheating, the liquid is preferably pressurized.

The coolant circuit preferably has a liquid pump for driving the liquid around the circuit. In order to enhance the degree of cooling provided by the liquid in the coolant circuit, it may be preferable to provide an auxiliary cooler downstream of the secondary heat exchanger.

In its simplest form, the coolant circuit comprises a single circuit having a single heat exchanger. The combustor will generally have a lubricated portion which must be maintained at a relatively low temperature (for example, less than 200° C.) to prevent degradation of the lubricant. On the other hand, the combustor will generally have a non-lubricated portion such as the cylinder head which can be allowed to reach higher temperatures. If a single coolant circuit is used, then it should be arranged so that the coolant passes to the cooler lubricated surfaces before the hotter non-lubricated surfaces. However, in order to provide sufficient cooling to a highly rated combustor with a relatively small temperature difference between the metal surfaces and the coolant, it is necessary to have a high heat transfer coefficient and therefore a higher flow rate. Unfortunately, if the flow rate is high, the coolant temperature does not rise very much, with the result that the final coolant temperature is too low at the secondary heat exchanger. Therefore, for some applications, the engine may be arranged such that the secondary heat exchanger comprises a high temperature heat exchanger and a low temperature heat exchanger, and the coolant circuit comprises a high temperature circuit and a low temperature circuit, the high temperature circuit having a high temperature pump arranged to circulate liquid past a relatively high temperature part of the combustion chamber and through the high temperature heat exchanger, the low temperature circuit having a low temperature pump arranged to circulate liquid past a relatively low temperature part of the combustion chamber and through the low temperature heat exchanger, and means to feed the compressed air from the separator through the low temperature heat exchanger to receive heat and subsequently through the high temperature heat exchanger to receive further heat prior to entry into the primary heat exchanger. The combustor coolant flow rate, and hence the heat transfer coefficient, can be maintained at a high level in both circuits, with a relatively small temperature change in each circuit.

The maximum coolant temperature can in each case be maintained at the highest level acceptable to the lubricated and non-lubricated surfaces respectively.

In this case, the engine preferably further comprises means to add liquid into the compressed air in separate elements of the low temperature heat exchanger all of which liquid is evaporated in the low temperature heat exchanger, and in separate elements of the high temperature heat exchanger all of which liquid is evaporated in the high temperature heat exchanger. This again solves the problem of controlling the phase distribution of the air/liquid entering the low and high temperature heat exchangers.

As an alternative to the above mentioned arrangement with low and high temperature heat exchangers, the coolant circuit may comprise a main pump for pumping liquid around a main circuit including the secondary heat exchanger, a low temperature circuit which is fed with liquid from the main circuit, a low temperature pump for pumping liquid around the low temperature circuit past a relatively low temperature part of the combustion chamber, a high temperature circuit which is fed with a bleed flow of liquid from the low temperature circuit, a high temperature pump for pumping liquid around the high temperature circuit past a relatively high temperature part of the combustion chamber, and means to feed a bleed flow of liquid from the high temperature circuit to the secondary heat exchanger.

This arrangement allows the high and low temperature circuits to be maintained close to their respective maximum temperatures and allows high flow rates through the combustor, while still allowing the primary side of the secondary heat exchanger to have a modest flow rate. This has the advantage over the previous arrangement that it only requires a single heat exchanger. On the other hand, three pumps are required. The choice of system therefore depends to some extent on the relative cost of the components.

The precompressor may be arranged to be driven entirely by the exhaust gas as in WO 94/12785. However it has been found that the power output of the engine can be substantially increased if the precompressor is arranged to be driven only partially by exhaust gas. Also it is found that the engine is more flexible in the sense that it can change load much more quickly if the precompressor has an additional source of power, which is independent of the exhaust gas.

The power output of the engine is primarily determined by the mass flow of air and by the final pressure delivered by the compression system to the combustor cylinders. The higher the mass flow of air, the more fuel can be added at constant fuel to air ratio, subject to thermal loading limits of the engine. Also higher pressures increase the scope for expansion of the combustion gases and it is possible to increase the fuel to air ratio, subject to limits on emissions, to take advantage of this. Both the efficiency and power output improve with increasing fuel to air ratio, providing that the efficiency of the combustion process itself can be maintained.

The isothermal compressor is capable of providing the largest part of the overall pressure ratio of the compression system. Typically, an isothermal compressor as used in the present invention is most suitable for a compression ratio in the range of about 10:1 to about 25:1. If, for example, an overall pressure ratio of 100:1 is required, this could be achieved if the isothermal compressor delivers 25:1 and the precompressor delivers 4:1. Higher pressure ratios can be achieved by using two isothermal compressors in series. Both isothermal compressors would preferably be driven from the same crankshaft.

With inlet air pressure of $10^5$ Pa, depending on the exhaust gas temperature, a conventional turbocharger can deliver a pressure of about $4 \times 10^5$ Pa to the inlet of the isothermal compressor, which can therefore deliver a pressure of about $10^7$ Pa, without any form of supplementary compression. However if the pressure at the inlet to the isothermal compressor is doubled to $8 \times 10^5$ Pa during periods of high power demand, then it is possible for an isothermal compressor of the same physical size to deliver twice the mass flow of air at the same outlet pressure of $10^7$ Pa. The efficiency of the engine would be reduced by a few percentage points because the power required to drive a supplementary compressor would be greater than the saving caused by the reduction in the pressure ratio of the isothermal compressor to 12.5:1. However the increase in power output achieved by this method amounts to nearly 50%. This is one example of the increased power output and flexibility, which can be achieved by providing supplementary compression.

Another advantage arises since the supplementary compression does not depend entirely upon the available energy in the exhaust gas. Engines, which rely only on a turbocharger to provide air compression upstream of the reciprocating unit, take a significant time to respond to a demand for additional power. This is because of the time lag, which exists between an increase in fuelling and the consequent increase in speed of the turbocharger.

A further major advantage of supplementary compression arises because it allows the possibility to increase the maximum pressure. This allows the engine to achieve high power output simultaneously with high efficiency.

This arrangement thus provides an engine in which the net engine power is significantly increased, while the high cycle efficiency of the prior art is either maintained or not affected too adversely. Also, this arrangement is capable of providing a substantial improvement in the control and speed of response of the engine.

In addition to being driven by the exhaust gas, the precompressor may be driven either by a power source external to the engine cycle, such as an electric motor, or it may be driven by power generated by the expansion of gases acting on a piston in the combustion chamber. In this latter case, when a main crankshaft is driven by gases acting on a piston in the combustion chamber, this crankshaft is used to drive the precompressor, preferably via a gearbox.

A further alternative is to provide a heat source such as a burner to increase the temperature of the exhaust gas which drives the precompressor. This provides a simple way of increasing the power to the precompressor and is particularly suited to increasing the power for a short period.

The precompressor may be an single compressor with a dual power source. However, preferably, the precompressor comprises two compressors connected in series, one of which is driven by the exhaust gas, and the other of which is not. In this case, it is preferable for the one compressor to have a higher compression ratio than the other compressor, and wherein heat is recovered downstream of the one compressor. In other words, the exhaust gas is used to provide a higher degree of compression than the other power source. Typically, the one compressor may have a compression ratio of at least twice that of the other.

If the precompressor consists of two compressors placed in series, one of which is driven by the exhaust gas and the other by a separate source of power, then it is possible to have one or the other in the upstream position. The choice may be made on the basis of availability of suitable components and on the pressure and flow characteristics of the component compressors over a range of part load conditions.

The other compressor, i.e. the compressor not driven by the exhaust gas, may be any suitable compressor. However, it is preferable for the other compressor to be a rotary compressor as this can handle large flow volumes at relatively low cost. In this case, the rotary compressor is preferably a single-stage centrifugal compressor. In order to provide the necessary degree of control, the other compressor may either by driven by a variable speed motor, or it may be a variable geometry compressor. A further option is for the other compressor to have variable inlet guide vanes as these can reduce the compression ratio of a fixed speed compressor by altering the inlet swirl angle.

In order to improve the efficiency of the precompressor, an intercooler is preferably provided to cool the air between the two compressors of the precompressor. A further improvement can be provided by using an air pre-cooler to cool the air between the precompressor and the isothermal compressor. This ensures that the air entering the isothermal compressor is at the lowest possible temperature. When the secondary heat exchanger recovers heat from the air from the precompressor, the air pre-cooler is positioned downstream of the secondary heat exchanger. Further cooling of the air entering the isothermal compressor can be provided by a spray of water which cools the air prior to its entry into the isothermal compressor.

The positive displacement isothermal air compressor may be a compressor such as a sliding vane or screw compressor. However, it is preferable for this to be a reciprocating compressor in which a piston reciprocates in a cylinder to compress the air.

Preferably, in order to provide an engine which is readily able to cope with large variations in power demand, there is provided a storage chamber, means to feed the compressed air from the isothermal compressor to the storage chamber, means to feed compressed air from the storage chamber to the combustion chamber, and a valve system for selectively feeding compressed air from the isothermal compressor either to the storage chamber or to the combustor, and for selectively feeding compressed air from the storage chamber to the combustion chamber.

Thus, at times of low power demand, air can be compressed and stored, for example in pressure vessels, high pressure piping or an underground cavern of some kind. This compressed air can then be used for power generation during periods of high demand. The engine is particularly suited to storage of compressed air, as the air leaving the isothermal compressor is at a pressure at which it can be used in the combustor, so it can be stored without requiring further compression and used directly without wasteful pressure reduction. As the engine can operate efficiently over a range of system pressures, there is no need to compress the air to a significantly higher pressure than the pressure at which it will be used and then throttle the air to the correct operating pressure before it is used. Also, as the air compressed by the isothermal compressor is cold, there is no need to remove heat prior to storage.

In order to improve the flexibility of the system with the storage capability further the isothermal compressor and combustor are preferably connected by a drive shaft, and a motor/generator is coupled to the shaft between a pair of clutches. Also, a generator may be provided which is driven by exhaust gas from the engine and an independent power supply may be provided for the precompressor.

If a means is provided to recover heat from a part of the engine and transfer the heat to a site external to the engine, the engine can be used as a combined heat and power (CHP) system. In this case, it is preferable for there to be means to control the relative amounts of power and heat for external use generated by the engine. The heat can be recovered from any suitable part of the invention. However, one current preference is to provide a bypass line transporting a proportion of the compressed air and/or the exhaust gas past the primary heat exchanger and a bypass valve for controlling the flow through the bypass line. This allows some of the compressed air to be fed directly to the combustor without passing through the primary heat exchanger with a consequent reduction in the temperature of the compressed air entering the combuster. However, the exhaust gas will have given up less of its heat and hence leaves the primary heat exchanger at a higher temperature. This higher temperature exhaust gas can be used for external heating. The valve allows the amount of compressed air bypassing the primary heat exchanger to be controlled by allowing the flexibility to generate different proportions of heat or power as required. Alternatively to the bypass line for the compressed air, a bypass line could be provided which bypasses a proportion of the exhaust gas around the primary heat exchanger. This has a similar effect to the compressed air bypass line. The bypass line and valve also have value independently of a CHP system. It could be used to have a similar effect to the burner, namely to raise the temperature of the exhaust gas which drives the precompressor, allowing rapid adjustment of the engine load.

To provide high grade heat for an industrial purpose, the primary heat exchanger may include a number of flow paths connected to an external heating circuit.

The invention also extends to a method of generating power, the method comprising compressing air in a positive displacement compressor; spraying liquid into the compressor as the air is compressed so that the compression is substantially isothermal; removing liquid from the compressed air; feeding the compressed air to a combustion chamber; injecting fuel; combusting the fuel and expanding the combustion gases in the combustion chamber to generate power; and feeding the exhaust gas from the combustion chamber to a primary heat exchanger to heat the compressed air upstream of the combustion chamber; characterised by recovering heat from a part of the engine and transferring this heat to the compressed air from the isothermal compressor upstream of the primary heat exchanger.

Preferably the method further comprises the step of compressing the air in a precompressor upstream of the positive displacement compressor, and wherein the step of recovering heat comprises recovering heat from the precompressor in a precompressor heat exchanger and recovering heat from the combustion chamber in a combustion chamber heat exchanger.

In this situation, the heat recovery can be improved by the steps of splitting the air from the positive displacement compressor into two streams and feeding one stream to the precompressor heat exchanger and the other stream to the combustion chamber heat exchanger, and controlling the split of the air into the two streams in such a way as to optimise the recovery of heat.

In order to optimise the performance of the two heat exchangers, the method preferably comprises controlling the fraction of air directed to each stream by means of a look-up table which specifies the required air split as a function of the various inlet conditions to the precompressor heat exchanger and combustion chamber heat exchanger.

A further improvement can be achieved by the step of supplying liquid to each of the two streams upstream of the respective heat exchangers and controlling the amount of liquid supplied to each stream.

As a further improvement, the method may comprise the steps of monitoring the temperature differential between the incoming and outgoing streams at the hot end of each of the precompressor and combustion chamber heat exchangers, and controlling the water flow to each of the heat exchangers so as maintain the temperature differential at a desired level.

Examples of engines constructed in accordance with the present invention will now be described with reference to the accompanying drawings in which.

BASIC ENGINE ELEMENTS

Figure 1:
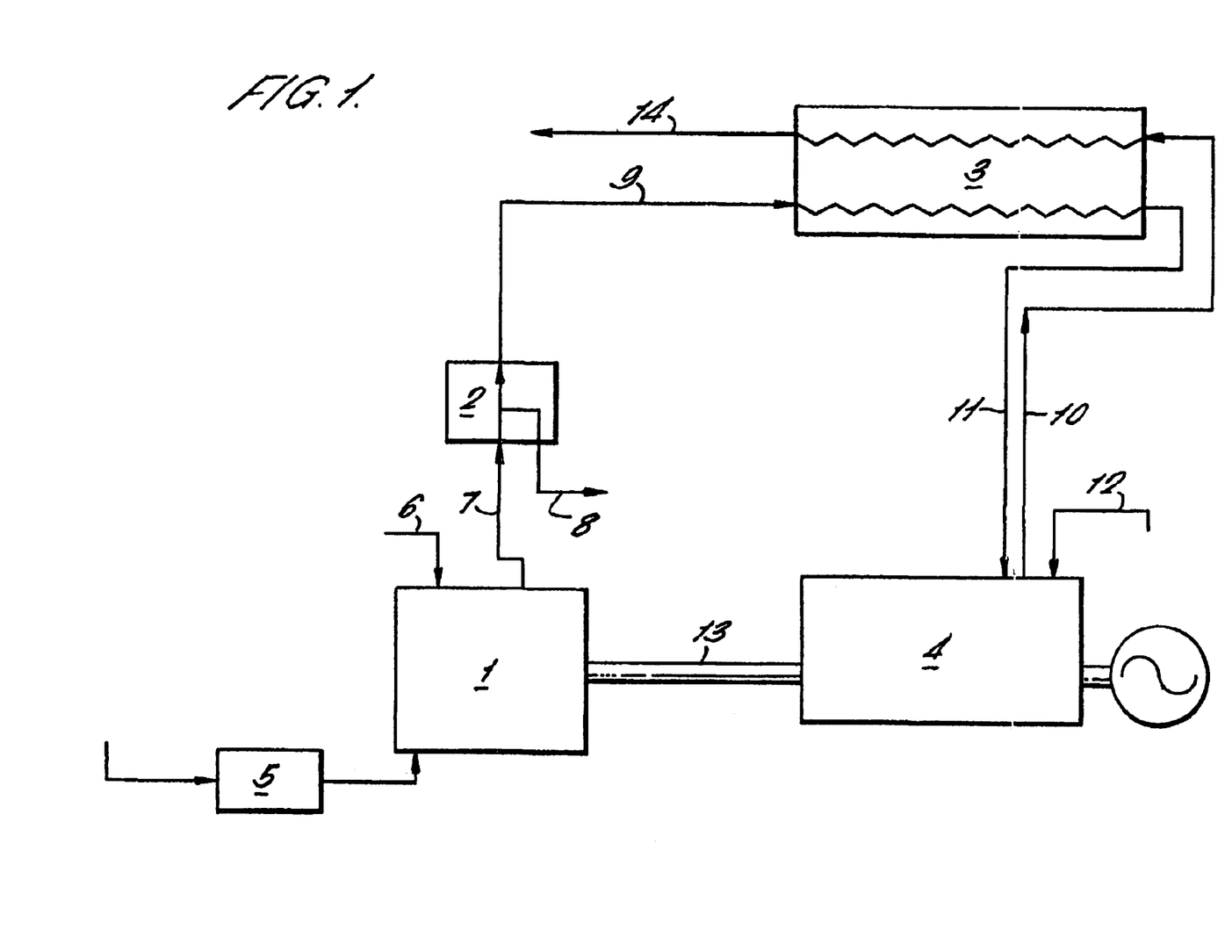
FIG. 1 is a schematic diagram showing the various basic elements of an engine to which the present invention can be applied.

The basic elements of the engine to which the invention is applied are shown in FIG. 1. The engine consists of four basic components, namely an isothermal compressor 1, a separator 2, a recuperator 3 and a combustor 4.

The isothermal compressor 1 is a reciprocating isothermal compressor comprising a single cylinder in which a piston reciprocates. A spray of water is provided by a spray pump 5 and air enters the isothermal compressor through air inlet 6. Suitable inlet and outlet valves are provided, such that on the downward stroke of the piston, air is drawn into the isothermal compressor through air inlet 6, and upon the return stroke, the air is compressed, while the spray of liquid is controlled so as to maintain the compression as near as possible to isothermal compression. The cold compressed air with the water entrained is forced out through isothermal compressor outlet 7 at the end of the compression stroke.

The isothermal compressor is described in WO 94/12785. Further details of the compressor, and in particular the arrangement of the nozzles used for the water spray are given in WO 98/16741.

The separator 2 separates the incoming stream into a water stream 8 and a cold compressed air stream 9. The cold compressed air stream 9 is then fed to the recuperator 3 where it is heated by exhaust gas in exhaust stream 10 leading from the combustor 4. This heated compressed air leaves the recuperator 3 as hot compressed air stream 11 which is fed to the combustor 4.

In the combustor 4, the hot compressed air is mixed with fuel provided from fuel inlet 12 and is combusted to generate power. The combustor is a reciprocating internal combustor, in this case comprising three cylinders. A crankshaft 13 driven by the combustor 4 is connected to the isothermal compressor 1, such that the isothermal compressor is driven directly by the combustor.

The exhaust gas which has given up heat to the cold compressed air leaves the recuperators as cooled exhaust stream 14 which may be either released to the atmosphere at this point, or used as described below.

The principles as described with reference to FIG. 1 are essentially those disclosed in FIG. 4 of WO 94/12785.

FIRST EXAMPLE

Figure 2:
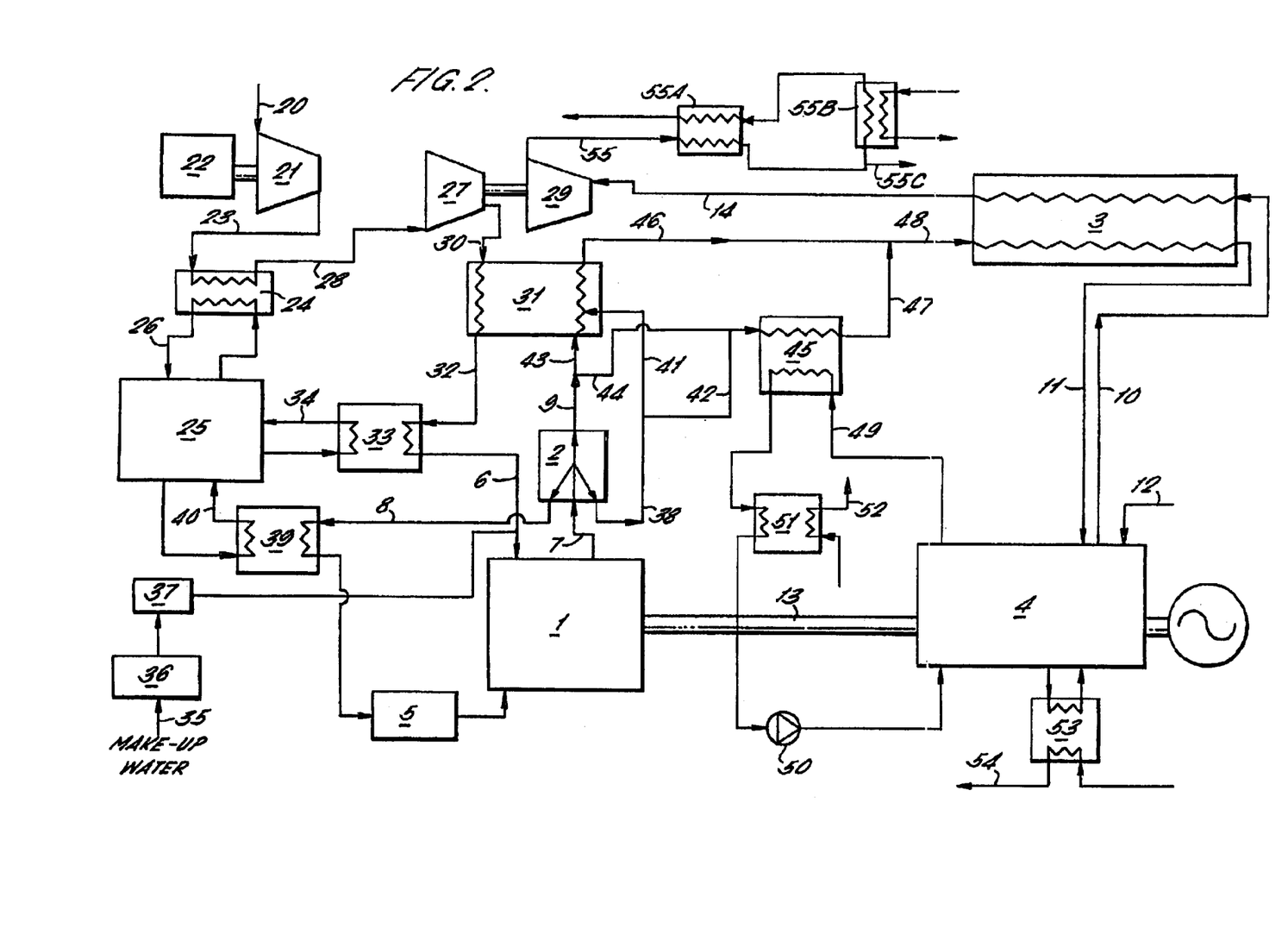
FIG. 2 is a schematic diagram showing the inter-relationship of the various components of a first engine.

A first example of an engine constructed in accordance with the present invention is shown in FIG. 2. This engine includes all of the features as previously defined in FIG. 1, and these elements are shown in FIG. 2 designated by the same reference numerals.

The example of FIG. 2 incorporates an air charge system for compressing incoming air upstream of the isothermal compressor 1.

Air enters the air charge system through ambient air inlet 20 and is initially compressed in an electric blower 21 driven by a variable speed motor 22. The blower 21 is a single-stage centrifugal compressor similar to that used in turbochargers. Alternatively it could be a screw compressor, a roots blower, axial fan, or one or more stages of reciprocating compressor. The compression may be isothermal or adiabatic. The most suitable form of blower is a rotary compressor since these can handle large flow volumes at relatively low cost. The blower could be driven at synchronous speed rather than at high speed, although it is likely to increase the number of stages and hence the physical size and cost. Instead of the variable speed motor 22, the blower 21 could be driven by mechanical means either from the main engine crankshaft or by some external power source.

Although a variable speed motor 22 is preferred from the point of view of efficiency at part load, from the point of view of cost it may be attractive to have a fixed speed centrifugal compressor with variable inlet guide vanes. Inlet guide vanes can reduce the compression ratio of a fixed speed compressor by altering the inlet swirl angle. The power consumption of the blower is also reduced but the efficiency falls, particularly at large guide vane angles. The cost saving arises because variable inlet guide vanes are relatively cheap compared to the cost of an inverter to provide variable frequency alternating current to drive the motor. Further cost saving is possible if the blower is driven by the engine via a gearbox. This saves the cost of the electric motor. Whether or not there is an improvement in efficiency depends on the efficiency of the motor relative to that of the additional gearing required.

The above arrangements could also include variable diffuser vanes to improve flexibility. Variable speed, variable inlet guide vanes and variable diffuser vanes are all known features which are sometimes employed to improve the flexibility of centrifugal compressors.

Typically the electric blower 21 is set up so as to provide a 2:1 compression ratio for the incoming air.

The air leaving the blower is discharged along electric blower discharge line 23 via an intercooler 24 which rejects heat to a cooling tower 25 via first cooling tower line 26. Although this heat is not utilised within the cycle, the temperature of the rejected heat averages approximately 65° C., so there would be little or no benefit in recovering this heat, unless the heat is used for some external purpose, such as space or water heating.

The air leaving the intercooler 24 enters a turbo compressor 27 via intercooler discharge line 28. The turbo compressor 27 typically has a compression ratio of approximately 4:1 and serves to compress further the already partially compressed air. The turbo compressor 27 is directly driven by turbo turbine 29 which is driven by exhaust gas as will be described below. Gas from the turbo compressor 27 is fed along turbo compressor discharge line 30 to turbo heat exchanger 31 where it gives up some of its heat to another part of the cycle as will be described below. The heat available on leaving the turbo compressor 27 is considerably greater than that available on leaving the blower 21 because of the higher compression ratio in the turbo compressor.

The air leaving the turbo heat exchanger 31 along turbo-heat exchanger cold discharge line 32 passes through air pre-cooler 33 which cools the air down close to the lowest available temperature dumping the rejected heat to cooling tower 25 along second cooling tower line 34. The average temperature of this heat is very low, so that there is little adverse effect on efficiency.

On leaving the air pre-cooler, the cold partially compressed air enters the isothermal compressor 1, and is compressed as previously described.

Figure 3:
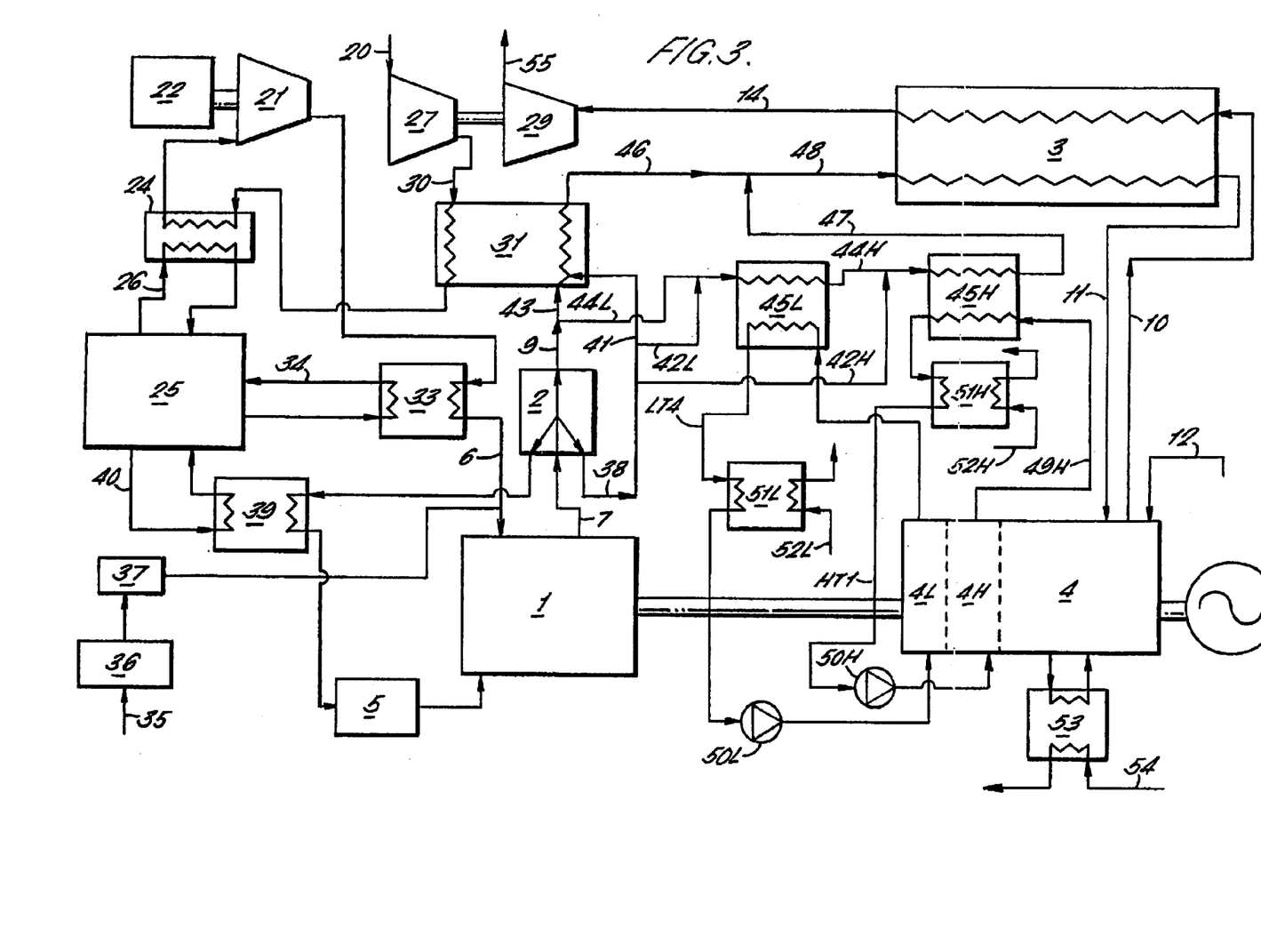
FIG. 3 is a schematic diagram showing the inter-relationship of the various components of a second engine.
Figure 4:
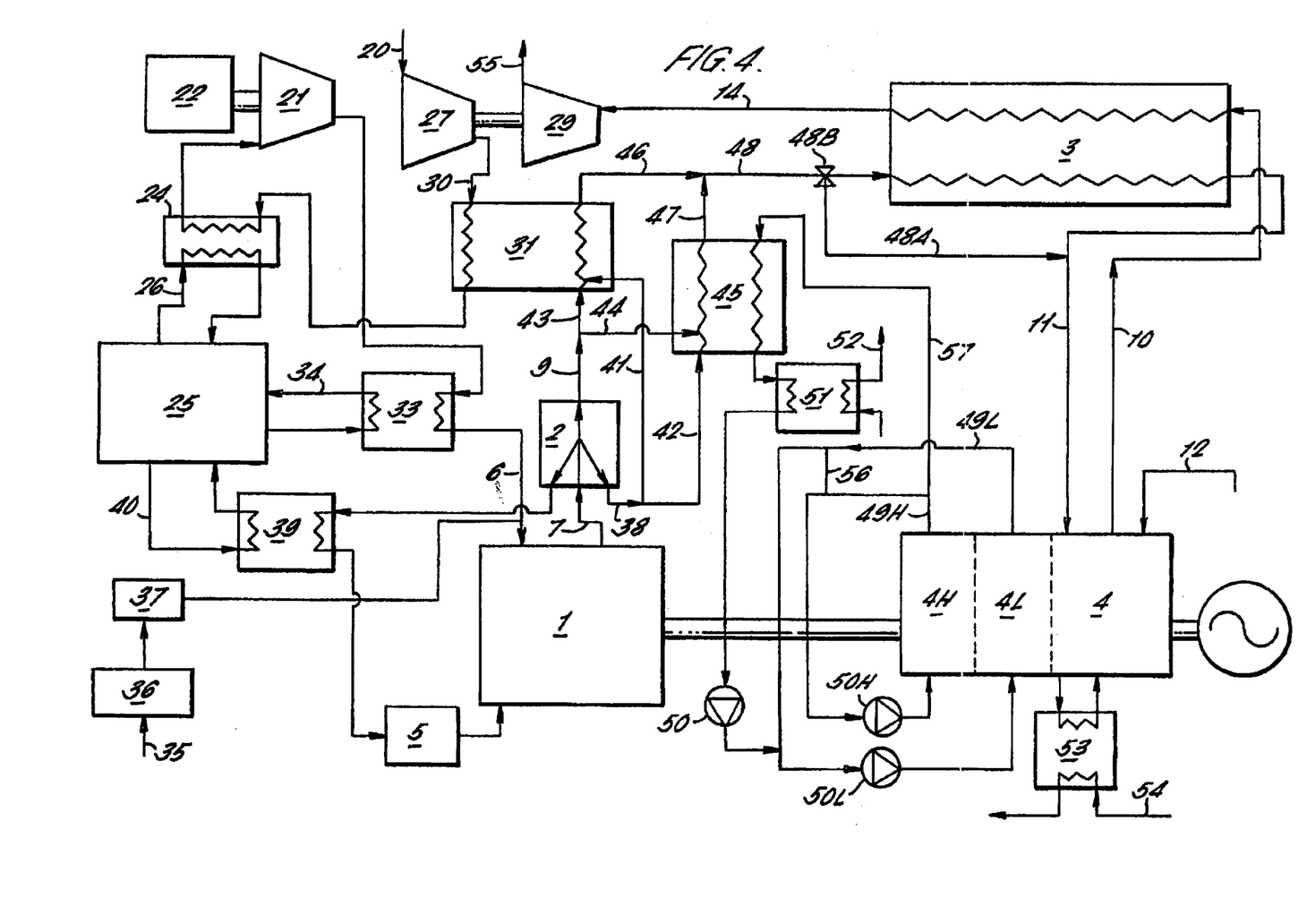
FIG. 4 is a schematic diagram showing the inter-relationship of the various components of a third engine.

In an alternative arrangement which is shown in FIGS. 3 and 4, the initial precompression is done by the turbo compressor 27. The air leaving the turbo compressor 27 then gives up its heat in turbo heat exchanger 31 before being fed via inter-cooler 24 to blower 21 for further compression. It is then fed to the isothermal compressor 1 via air precooler 33 as described with reference to FIG. 2.

Returning to the example of FIG. 2, water is injected into the air, both just upstream of the isothermal compressor 1, and into the isothermal compressor 1 during compressions as previously described. The water system shown has a make-up water supply line 35 to replace water lost from the water supply system during operation. The water from the make-up water supply line is supplied via a deioniser 36 and is pumped by pump 37 so as to enter the air inlet 6 through an atomising nozzle located just upstream of the isothermal compressor 1. This provides additional cooling to the air at this point thus maximising the mass of air that is compressed at each stroke. A further advantage of adding make-up water at this point is that the make-up pump need only pump the water to the isothermal compressor inlet pressure.

Water and compressed air leave the isothermal compressor 1 via isothermal compressor outlet 7 and are fed to separator 2. The separator separates the water from the compressed air, the water being discharged as first water stream 8 and second water stream 38.

The first water stream 8 gives up its heat in spray water cooler 39 to cooling tower 25 via third cooling tower line 40. The cooled water is then pumped from the spray water cooler 39 into the isothermal compressor by spray pump 5 as previously described.

While the bulk of the liquid is returned via first water stream 8, a bleed flow of liquid is provided as second water stream 38. This is split into two flows as turbo heat exchanger water stream 41 and engine heat exchanger stream 42. Similarly, the air stream 9 leaving the separator is split into a turbo heat exchanger air stream 43 and an engine heat exchanger air stream 44.

The two turbo heat exchanger streams 41, 43 are then recombined in turbo heat exchanger 31 where they receive heat from the flow discharge from the turbo compressor 27. Similarly, the two engine heat exchange streams 42, 44 are combined in an engine heat exchanger 45 so as to receive heat from the engine cooling system as will be described below.

The water added to the turbo heat exchanger 31 and engine heat exchanger 45 approximately equalises the thermal capacity on both sides of each heat exchanger. The mass of liquid added should be sufficiently small that all of the liquid is evaporated in the heat exchanger. The reason why the air and liquid are separated and then recombined within the heat exchangers is that it is difficult to control the distribution within the heat exchanger of a two-phase mixture. The recombination of the two flows therefore only occurs within the individual elements of the heat exchanger, thereby allowing precise control of the phase composition.

The control of the air flow split and of the water injection will now be described. The air flow split is determined by the requirement to maximize the heat recovery from the turbo heat exchanger 31 and from the engine heat exchanger 45. The optimization may be achieved by the use of a look-up table embedded within the control system, which provides the optimum air flow split as a function of parameters, which define the inlet boundary conditions. These parameters include pressure, temperature, and flow rates of the air from the separator and the temperature and flow rate of the primary side fluids. The look-up table is derived from prior analysis of the cycle to find the optimum air flow split, including the effects of water addition.

The second step is to determine the water flow injected to each heat exchanger. The water may be injected, for example, by a separate metering pump for each heat exchanger. The control of the amount of water injected in each case can be based on the achievement of a particular primary to secondary temperature difference at the hot end of each of the heat exchangers. If the measured temperature difference is too low, then there is insufficient water to maximize the absorption of heat. If the measured temperature differential is too high, then not all of the water has been evaporated or the vapour enthalpy is too low and therefore the water injection rate should be decreased.

In addition, certain limits may be imposed to the amount of water injection depending on the air outlet temperature of the particular heat exchanger. Below a certain limit (around 120 deg. C.), no water is injected. The limits are imposed since very little evaporation would take place in the compressed air at low temperatures and it reduces the likelihood of excess water being injected, for example as a result of malfunction of the control system.

The reason why the method of using the measured differential temperature at the heat exchanger exit is effective in this respect is that the rate of temperature increase on the secondary side is low just prior to complete evaporation, relative to that on the primary side, because of the latent heat of evaporation. Once evaporation is complete, the temperature on the secondary side increases sharply. This causes a rapid narrowing of the temperature differential between the primary and the secondary sides of the heat exchanger just after complete evaporation. This narrowing effect is easily detectable and can be used to control the water input in such a way that there is rapid feedback to maintain the system at its optimum efficiency.

The above control methods can be used to operate the engine in an efficient manner over a range of load conditions. For example at high loads, there will be significant amounts of heat from both the turbo heat exchanger 31 and the engine heat exchanger 45, and there may be a roughly equal split of air between the two. There would also be a relatively high rate of water injection into both types of heat exchanger. At very low loads, the boost pressure of the turbo-compressor 27 reduces substantially and the control system will not direct any air or water to the turbo heat exchangers 31. The above system will be self optimising over a wide range of engine operating conditions including load changes, operating pressure, start-up and shut-down, and effects of ambient temperature changes or other effects on the cooling requirements of the engine.

A turbo heat exchanger hot discharge stream 46 and an engine heat exchanger discharge stream 47 are combined into combined discharge stream 48 which is fed to the recuperator 3 where it receives heat from the engine exhaust stream 10, and is then fed to the combustor 4 as hot air stream 11. Here it is combined with fuel from the fuel inlet 12, and combusted and expanded in order to generate power.

An engine cooling circuit 49 is provided to cool the engine and convey the recovered heat to the engine heat exchanger 45 where it is transferred to the engine heat exchanger water and air streams 42, 44. Water is used as the engine coolant fluid which is pumped round the circuit by water pump 50. An auxiliary engine cooler 51 is available if needed to provide additional cooling of the water downstream of the engine heat exchanger 45. The low grade heat removed in the auxiliary engine cooler 51 is dumped to cooling tower 25 along fourth cooling tower line 52. Heat from an oil cooler 53 is dumped to a cooling tower via fifth cooling tower line 54.

The cooled exhaust stream 14 leaving the recuperator is fed to turbo turbine 29, where it is expanded to drive the turbo compressor 27. The expanded exhaust gas from which most, if not all useful energy has now been extracted, is discharged through turbo turbine discharge line 55.

Option of Using a Turbocharger as the Only Precompressor

The most economic option may be one in which all the precompression is performed using a turbocharger of high pressure ratio. This system is illustrated by FIG. 2, with the removal of components 22, 21, 23, 24, 26 and 28. In this case the inlet air 20 passes directly into the turbocharger compressor 28. An overall pressure ratio greater than 100:1 could be achieved in such a system with a turbocharger having a high performance titanium impeller and with a recuperator of reduced surface energy which leaves more energy in the exhaust gas.

Optional Exhaust Gas Water Recovery

The cycle illustrated in FIG. 2 can be adapted, if necessary, to recover water from the exhaust gas. This optional feature is desirable in applications where water is scare or expensive. In order to recover water from the exhaust gas, the turbo turbine discharge line 55 passes to the primary side of a rotary regenerator 55A and then to an exhaust gas cooler 55B and back to the secondary side of the rotary regenerator 55A before being discharged to atmosphere.

The exhaust gases contain the original moisture in the ambient air, as well as the added water and the water vapour produced by hydrogen in the fuel. As the exhaust gases are cooled in the cooler 55B, the water condenses and can be collected as recovered water stream 55C. This water can be added to the make-up water supply line 35. The purpose of the rotary regenerator 55A is to cool the exhaust gas prior to final cooling. The heat absorbed is then restored to the exhaust gas prior to release in order to improve the buoyancy of the warm exhaust gases and to assist the dispersion of the gases in the atmosphere. The rotary regenerator 55A is a convenient method of achieving good heat transfer in the situation where the pressure difference between the two streams is small and where modest leakage between the flows can be tolerated.

Although described with reference to the first example, this water recovery apparatus can be used with any subsequent example.

SECOND EXAMPLE

A second example of an engine in accordance with the present invention is shown in FIG. 3. This is the same in most respects as the engine of FIG. 2, and the same reference numerals have been used to designate the same components.

As previously described, the turbo compressor 27 and blower 21 shown in FIG. 3 are arranged in the opposite configuration from that of FIG. 2.

The other significant difference between FIGS. 2 and 3 is in relation to the engine coolant circuit. In this case, the single engine coolant circuit 49 of FIG. 2 is replaced by a low temperature coolant circuit 49L and a high temperature coolant circuit 49H. Both circuits consist of the same basic components as the current circuit 49 of FIG. 2, and have been designated with the same reference numerals, with the low temperature circuit components being designated by "L" following the reference numeral, and high temperature components being designated by "H" following the reference numeral.

The low temperature circuit is arranged to extract heat from a low temperature part 4L of the combustor 4. Typically, low temperature part 4L will include the cylinder liner and valve guides which are lubricated. Liquid is pumped around the low temperature circuit by low temperature water pump 50L through low temperature heat exchanger 45L and subsequently through low temperature auxiliary engine cooler 51L where heat is rejected to a cooling tower through line 52L.

The high temperature circuit extracts heat from a high temperature part 4H of the combustor 4. The high temperature part typically includes the cylinder head and the inlet and exhaust valve ports which are not lubricated and can therefore be allowed to reach higher temperatures. Liquid is pumped around the high temperature circuit by high temperature water pump 50H through high temperature engine heat exchanger 45H and subsequently through high temperature auxiliary engine cooler 51H where heat is rejected to a cooling tower through line 52H.

The low temperature engine heat exchanger 45L is fed with separate engine heat exchanger water 42L and air 44L streams which are combined in the heat exchanger, as in the previous example. The combined streams are then heated in the low temperature engine heat exchanger 45L and the liquid is vaporised. The stream 44H leaving the low temperature engine heat exchanger 45L is fed to the high temperature engine heat exchanger 45H. A separate high temperature engine heat exchanger water stream 42H is combined with the stream 44H in the high temperature engine heat exchanger 45H. This is done for the same reason that the water was added separately to the low temperature engine heat exchanger, namely to allow control of the distribution of the two phases within the heat exchanger. This additional liquid is vaporised in the higher temperature heat exchanger 45, and the engine heat exchange discharge stream 47 is subsequently treated in the same way as in FIG. 2.

THIRD EXAMPLE

A third example of an engine in accordance with the present invention is shown in FIG. 4. This is the same in most respects as the engine of FIG. 3, the same reference numerals having been used to designate the same components.

The difference between the example of FIG. 3 and FIG. 4 is the engine coolant circuit 49.

Unlike FIG. 3, the example of FIG. 4 comprises a single engine heat exchanger 45 and single auxiliary engine cooler 51. The action of the engine heat exchanger 45 in terms of heating the incoming compressed air and liquid streams is the same as was described with reference to FIG. 2, as are the main coolant circuit components including main water pump 50 and auxiliary engine cooler 51.

In FIG. 4, as in FIG. 3, separate high temperature and low temperature circuits are provided to cool the high temperature part 4H and a low temperature part 4L of the engine. However, in FIG. 4, unlike FIG. 3, the circuits are connected and therefore the same liquid flows through both circuits. Water is pumped around a high temperature circuit 49H by pump 50H through the high temperature part 4H of the combustor. Water is pumped around a low temperature circuit 49L by a low temperature water pump 50L to cool the low temperature part 4L of the combustor 4. A first flow path 56 connects the low temperature circuit 49L with the high temperature circuit 49H and a second flow path 57 leads from the high temperature circuit 49H to the main coolant circuit 49.

Water is, pumped into the low temperature circuit 49L by main pump 50 and is pumped to the low temperature part 4L of the combustor 4 by low temperature pump 50L. Most of this heated water then recirculates around the low temperature circuit 49L, but some of this leaves the low temperature circuit via first flow path 56 and enters the high temperature circuit 49H. This water mixes with the recirculating hot water in the high temperature circuit 50H which is circulated by high temperature pump 50H past the high temperature part 4H of the combustor 4. Some of this flow is then displaced along the second flow path 57 to the main coolant circuit 49 and hence to the engine heat exchanger 45. This water gives up its heat in the engine heat exchanger 45, and is then pumped back into the low temperature circuit 49L by main water pump 50.

Conservation of mass requires that the flow around the main water pump 50 is the same as the flow through the first and second flow paths 56, 57. This flow is governed by the main water pump 50. The flow rates in the high 49H and low 49L circuits, which can be much higher than the flow in the main circuit, are governed by their respective pumps 50H, 50L. Thus it is possible to maintain the high 49H and low 49L circuits close to their respective maximum temperatures, maintain high flow rates through the combustor, yet allow the primary side of the heat exchanger 45 to have a modest flow rate.

FIG. 4 shows a bypass line 48A leading from the discharge stream 48 under the control of bypass valve 48B. This causes a proportion of the preheated compressed air to bypass the recuperator 3 and be fed directly to the combustor 4. This will cause an overall reduction of the temperature of the air fed to the combustor 4, but will cause a corresponding increase in the temperature of the exhaust gas leaving the recuperator 3 as exhaust stream 14. The additional heat in this stream can be used either for external heating or to provide additional power to the turbo turbine 29. Although this bypass line 48A has been illustrated in the example in FIG. 4, it can be applied to any of the examples described. A similar arrangement may be used to bypass a proportion of the exhaust gas around the recuperator 3.

Combined Heat and Power (CHP)

All of the cycles described attempt to recover as much useful heat as possible and return this to the cycle in order to improve thermodynamic efficiency. The cycles are readily adaptable for use as combined heat and power (CHP) system in which the low grade heat, which would otherwise be recovered into the cycle or dumped to the cooling tower, is used externally of the cycle to supply a demand for low temperature heat, such as for space heating or water heating. This flexibility arises from the potential to control various flows and temperatures to optimise the electrical efficiency, to optimise overall efficiency, to maximise power output, to maximise heat output, or to achieve a particular heat to power ratio. Since low grade heat cannot be stored economically or transmitted over any significant distance, this flexibility is valuable in coping with the fluctuations in demand for heat from hour to hour, day to day or from one season to another.

The engine can also maintain a high electrical conversion efficiency over a wide range of power, which is a consequence of the combination of isothermal compression with recuperation of exhaust heat. Thus the dual flexibility of both heat and power, while maintaining high efficiency, allows the heat to power ratio to be varied over a considerable range to match the current demand for each product. This is not the case in CHP systems linked to other prime movers.

The engine cycle has a number of potential sources of low grade heat which can be used for external heating. These include the intercooler 24, the turbo heat exchanger 31, the air precooler 33, the spray water cooler 39, the engine heat exchanger 45, the oil cooler 53, and the turbo-discharge line 55. If either the turbo heat exchanger 31 or the engine heat exchanger 45 is used as a source of heat for CHP it would be desirable to reduce or stop the water injection, otherwise the air entering the recuperator 3 would be too cold and the exhaust gas leaving the cold end of the recuperator would not have sufficient energy to drive the turbo turbine 29. For the same reason it would not be desirable to use,both the turbo heat exchanger 31 and the engine heat exchanger 45 as a source of heat for CHP. If the spray water cooler 39 is used as the source of heat, the isothermal compressor can be deliberately run with a lower water flow, so that the water is heated to a higher temperature. Extra heat is therefore generated at the expense of the cycle efficiency.

Additionally, a portion of the combined discharge stream 48 can be arranged to bypass the recuperator 3 and be combined with the hot air stream 11 downstream of the recuperator. This reduces the temperature of the air supplied to the combustor 4, but increases the temperature of the exhaust gas going to the turbo turbine 29. This higher temperature gas can either be used to increase the power generated by the turbo turbine 29, or can be used to increase the temperature of the gas in the turbo turbine discharge line 55 which can then be used as heat externally of the cycle. The amount of air bypassing the recuperator can be controlled by a valve so as to provide the flexibility to cope with varying power and heat demands. An alternative method of achieving a temperature increase in the exhaust gas leaving the recuperator is to provide a bypass for the hot exhaust gas leaving the combustor through line 10, so that a controlled amount of this gas does not pass through the recuperator but flows through a control valve directly to line 14. In this configuration, the bypass control valve would need to withstand the hot gas temperature, but there would be advantages of this type of bypass in terms of the speed of response to any adjustment.

All the options for CHP described above are only suitable for the external provision of low grade heat for space heating or water heating, for example. It is also possible to adapt the engine so that it can provide high grade heat for industrial purposes. Industrial co-generation often requires the production of saturated steam at about 10 bars and a temperature of 180° C. The method of providing heat in this form is described as follows.

A certain fraction of the tubes within the recuperator are not connected to the flow circuit of the engine but are connected instead to a separate external steam-water circuit. The external circuit provides a pumped flow of water, which is preferably at or near the saturation temperature at the desired operating pressure. The choice of water pressure is made to suit the industrial process, since a wide range of pressures can be accommodated within the tubing. The saturated water is progressively evaporated to steam as it flows along the recuperator tubes. Depending on the water flow rates and the gas temperatures on the primary side of the recuperator, the fluid exiting the recuperator at the hot end may be a two-phase steam water mixture, or it may be saturated or superheated steam. This high enthalpy fluid is then taken away to perform the required heating duty, during which the steam is condensed. The condensed water then return to the recuperator via a pump.

The remaining fraction of the recuperator tubes carry the high pressure air, which is the normal engine working fluid as described previously. As a significant proportion of the heat available in the recuperator is diverted to provide external heat in the form of steam, it is inevitable that the final air temperature leaving the recuperator will be reduced. The reduction in the air temperature provided to the combustor means that more fuel will need to be burned in order to restore the power output of the engine. Clearly this has an impact on the electrical efficiency of the engine, but this reduction is compensated by the output of useful heat.

There are various possible arrangements of the two sets of tubing and their associated gas flows in the recuperator. The two gas paths may be placed in series so that the tubes containing air encounters exhaust gas at high temperature, but the steam tubes encounter the partially cooled exhaust gas at modest temperatures. This arrangement is good from the point of view of maximising efficiency and maintaining a compact recuperator. Alternatively the two sets of tubes can be arranged with separate gas flow paths running in parallel. Another possibility is to alternate steam tubes with air tubes within a single common gas flow path in such a way to avoid mechanical stresses arising from large differences in gas temperature at a particular axial location.

One advantage of using the engine for industrial co-generation in the manner described is that the recuperator already exists as part of the engine. This reduces the costs of the steam plant relative to a conventional installation, particularly in view of the beneficial effect of the high gas pressure on the heat transfer. Another advantage is that it is possible to have flexible co-generation by suitable arrangement of the tubing. For example, if the air and steam tubes are alternated within the same gas path as described above or if the two sets of tubes were placed in series, it is possible to vary the amount of heat extracted for the purposes of co-generation, while utilising the remaining heat in the optimum way for power generation.

An alternative method of providing heat of high enough temperature to provide steam for industrial co-generation is to introduce a supplementary fuel burner into the pipe 14 taking the exhaust gas from the recuperator to the turbocharger turbine. A steam generator would be placed in the exhaust gas stream 55 exiting from the turbo-turbine. This option has also been mentioned in connection with providing flexibility for load changes.

Compressed Air Storage

Figure 5:
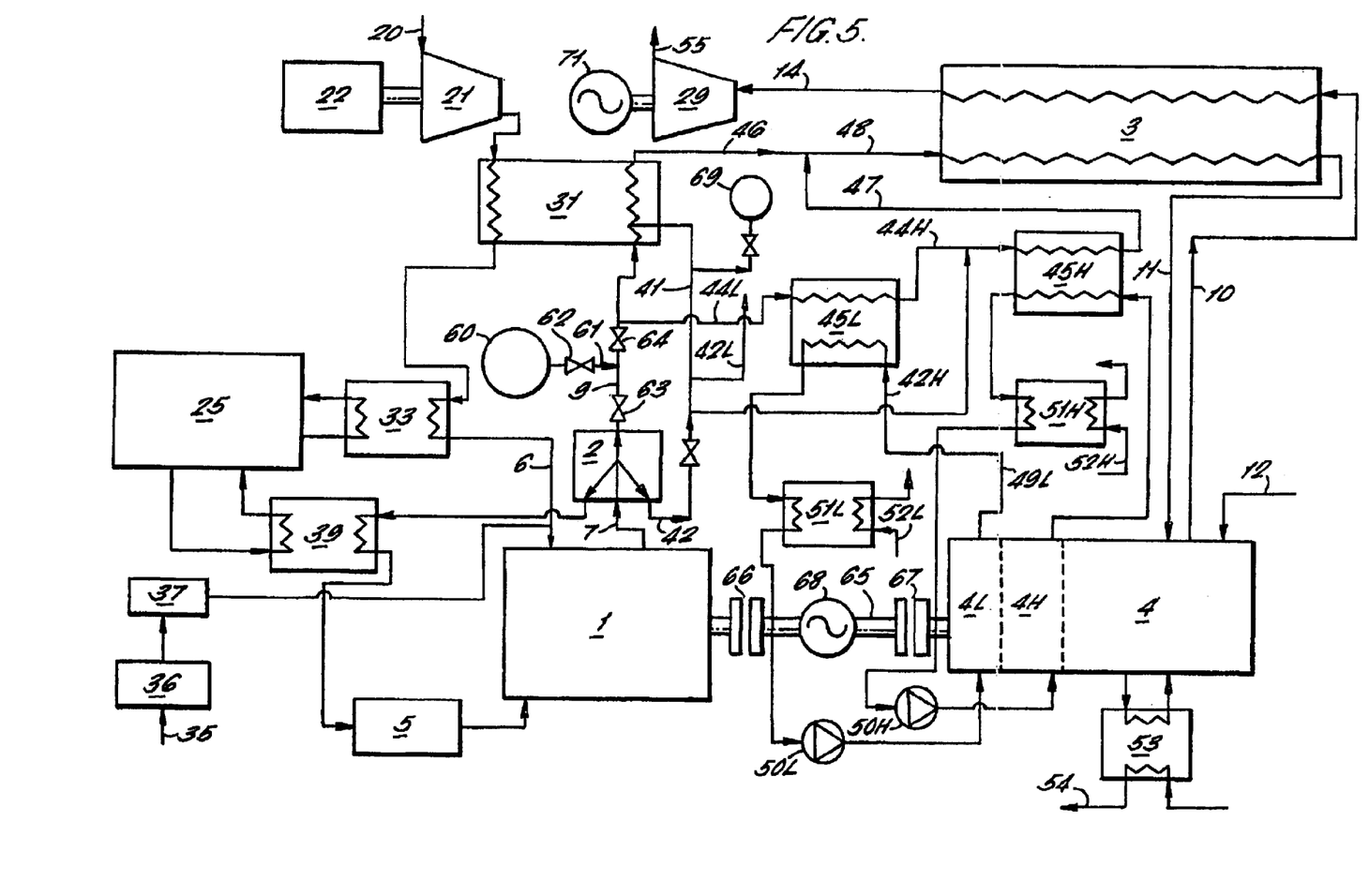
FIG. 5 is a schematic diagram showing the inter-relationship of the various components of a fourth engine.

The engine may also be adapted to have a compressed air energy storage system as shown in FIG. 5. In this figure, most of the same elements are present as in FIG. 3, and are designated by the same reference numerals. In addition, this system has a storage chamber 60 connected to air stream 9 downstream of the separator 2 by storage line 61. A storage valve 62 allows selective flow of compressed air to and from the storage chamber 60. Further storage valves 63, 64 are provided either side of the storage line 61 to allow full control of compressed air between storage chamber 60 and the engine system in its various operating modes.

A water storage volume 69 and water storage valve 70 are also provided for the selective supply of stored water into the system.

The process of storing compressed air requires the compression system to produce a greater quantity of compressed air than is used to drive the combustor. This can be achieved by increasing the pressure and flow delivered by the blower 21 and turbo turbine 29 to the isothermal compressor. Up to a point this can be done with an unchanged configuration of the engine by increasing the power to the blower 21. However, it is difficult to balance the pressure-flow characteristics of the turbocharger if the mass flow through the turbo compressor 27 becomes much greater than the mass flow through the turbo turbine 29.

Similarly the process of using the stored compressed air to increase the power output of the engine requires that the pressure and mass flow rate delivered by the blower 21 and turbo turbine 29 to the inlet of the isothermal compressor 1 should be reduced. Again this can be achieved up to a point with an unchanged engine configuration by decreasing the power input to the blower. However there will again be an imbalance between the mass flows of the turbo compressor 27 and the turbo turbine 29.

The ability of the blower 21 and turbo turbine 29 to deal with a range of conditions in which the compressed air flow may be substantially different from the exhaust gas flow may be greatly improved by having a turbine which is physically disconnected from a compressor, as shown in the diagram in FIG. 5. In this case the turbine is connected to a subsidiary generator 71 and a separate motor powers the entire pre-compressor. In this arrangement it is possible for the pressure and mass flow delivered by the blower 21 and turbo turbine 29 to be high at the same time that the power delivered by the turbine is low. The opposite situation is also possible. The engine can therefore operate over a wide range of conditions from a high rate of compressed air storage, through self-sustaining power generation through to a high power production with rapid extraction of compressed air from storage.

If the main generator can be run as a motor, then with the benefit of the re-configured pre-compressor it is also possible to drive both the pre-compressor and the isothermal compressor using external power. It is also possible to shut down the pre-compressor completely and simply turn the isothermal compressor over with minimal power consumption.

The method of recovering heat from the combustor coolant system may be applied under all conditions involving power generation. Whenever the pre-compressor is used to produce an increased pressure to the inlet of the isothermal compressor there will also be heat, which can be recovered from the compressed air. The ability to adjust both the water and air flows to the various parts of the secondary heat exchanger provides the flexibility to recover heat under a wide range of conditions.

If the engine is intended to run for long periods as a pure compressor or as a pure power generator, then there is an option to reconfigure the engine so that the motor-generator is situated between the isothermal compressor and the combustor. Connection of the motor-generator to either the isothermal compressor or to the combustor or to both at the same time would then be arranged using mechanical clutches as illustrated in FIG. 5. In this case the shaft 65 connecting the isothermal compressor 1 to the combustor 4 is split in such a way as to incorporate two clutches 66, 67 and a motor/generator 68. The clutches 66, 67 are preferably of the self-synchronising type in order that there is no slippage or heat generation. The clutches 66, 67 can selectively connect the motor/generator 68 to either the isothermal compressor 1 or the combustor 4, or to both of these at the same time. The motor/generator 68 can operate either as a motor or a generator as the name implies. With this facility it would be possible to run the compressor alone without turning the combustor or to run the combustor without the compressor. This would reduce parasitic friction losses caused by driving parts of the engine when they are not needed.

The flexibility of the compressed air storage system applied in the manner described is illustrated by the following list of modes of operation.
a) Normal power generation with no air added or extracted from the storage reservoir.
b) Compression system driven by external grid power and storage of all the air produced. In this mode, the combustor is inactive.
c) Power generation using air from storage. In this mode, the compression system is inactive.
d) Power generation matched to power consumption in the compression system, with no net generation. Most of the air produced in the compression system is stored.

Operation states also exist at an infinite number of intermediate conditions.

What is claimed is:
1. An engine comprising:
   a positive displacement isothermal air compressor (1) provided with a liquid spray to spray liquid into the air as it is compressed so that the compression is substantially isothermal;
   a combustion chamber (4) in which the compressed air is expanded to generate power;
   means (7, 9, 11) to feed the compressed air from the isothermal compressor to the combustion chamber;
   a separator (2) to remove liquid from the compressed air upstream of the combustion chamber;
   a primary heat exchanger (3) for transferring heat from exhaust gas from the combustion chamber to compressed air upstream of the combustion chamber;
   a precompressor (21, 27) to compress the air upstream of the isothermal compressor;
   and means (30, 32) to feed the air from the precompressor to the isothermal compressor;
   characterised by a secondary heat exchanger (31, 45) provided to transfer heat recovered from a part of the engine to the compressed air from the isothermal compressor (1) upstream of the primary heat exchanger (3).

2. An engine according to claim 1, wherein the heat for the secondary heat exchanger (45) is recovered from the combustion chamber (4).

3. An engine according to claim 1 or claim 2, wherein the heat for the secondary heat exchanger (31) is recovered from the air from the precompressor (21, 27).

4. An engine according to claim 2, wherein the secondary heat exchanger comprises a precompressor heat exchanger (31) and a combustion chamber heat exchanger (45) connected in parallel, and wherein the compressed air from the isothermal compressor is split into two streams (43, 44), one stream (43) being fed to the precompressor heat exchanger (31) to receive heat from air from the precompressor (21, 27), and the other stream (44) being fed to the combustion chamber heat exchanger (45) to receive heat from the combustion chamber (4); the engine further comprising means to control the split of the flow of air from the isothermal compressor into the two streams.

5. An engine according to claims 1 and 2, arranged such that liquid (38, 41, 42) is added to the compressed air entering the secondary heat exchanger (31, 45) in a quantity which will be vaporized in the secondary heat exchanger.

6. An engine according to claim 5, wherein the secondary heat exchanger (31, 45) has a number of heat exchange elements carrying the compressed air, and wherein the liquid is directly injected into each element.

7. An engine according to claim 6, arranged such that the liquid (38) is taken from the separator (2).

8. An engine according to claim 4, wherein liquid (41, 42) is supplied to each of the compressed air streams (43, 46, 44, 47) in the precompressor heat exchanger (31) and combustion chamber heat exchanger (45) respectively; the engine further comprising means to control the flow of liquid to the precompressor and combustion chamber heat exchangers (31, 45).

9. An engine according to claim 8, wherein the two streams (46, 47) are combined (48) upstream of the primary heat exchanger (3).

10. An engine according to claim 2, comprising a coolant circuit (49) containing liquid which cools the combustion chamber (4) and transfers the heat in the secondary heat exchanger (45) to the compressed air.

11. An engine according to claim 10, wherein the liquid is pressurised.

12. An engine according to claim 10 or claim 11, wherein the coolant circuit (49) has a liquid pump (50) for driving the liquid around the circuit.

13. An engine according to claim 12, wherein the circuit (49) includes an auxiliary cooler (51) downstream of the secondary heat exchanger (45).

14. An engine according to claim 10, wherein the secondary heat exchanger (45) comprises a high temperature heat exchanger (45H) and a low temperature heat exchanger (45L), and the coolant circuit (49) comprises a high temperature circuit (49H) and a low temperature circuit (49L), the high temperature circuit having a high temperature pump (50H) arranged to circulate liquid past a relatively high temperature part (4H) of the combustion chamber and through the high temperature heat exchanger, the low temperature circuit having a low temperature pump (50L) arranged to circulate liquid past a relatively low temperature part (4L) of the combustion chamber and through the low temperature heat exchanger, and means (44L, 44H) to feed the compressed air from the separator (2) through the low temperature heat exchanger to receive heat and subsequently through the high temperature heat exchanger to receive further heat prior to entry into the primary heat exchanger (3).

15. An engine according to claim 14, further comprising means (42L, 42H) to add water into the compressed air in separate elements of the low temperature heat exchanger (45L) all of which liquid is evaporated in the low temperature heat exchanger, and in separate elements of the high temperature heat exchanger (45H) all of which liquid is evaporated in the high temperature heat exchanger.

16. An engine according to claim 10, wherein the coolant circuit comprises a main pump (50) for pumping liquid around a main circuit including the secondary heat exchanger (45), a low temperature circuit (49L) which is fed with liquid from the main circuit, a low temperature pump (50L) for pumping liquid around the low temperature circuit past a relatively low temperature part (4L) of the combustion chamber, a high temperature circuit (49H) which is fed with a bleed flow (56) of liquid from the low temperature circuit, a high temperature pump (50H) for pumping liquid around the high temperature circuit past a relatively high temperature part (4H) of the combustion chamber, and means (57) to feed a bleed flow of liquid from the high temperature circuit to the secondary heat exchanger (45).

17. An engine according to claim 1, wherein the precompressor is arranged to be driven only partially by exhaust gas from the combustion chamber.

18. An engine according to claim 17, wherein the precompressor (21, 27) is partially driven by power generated by the expansion of gases in the combustion chamber (4).

19. An engine according to claim 18, wherein a main crankshaft (13) is driven by the expansion of gases in the combustion chamber (4), the main crankshaft being used to drive the precompressor (21, 27).

20. An engine according to claim 17, wherein the precompressor (21, 27) is partially driven by a source (22) of external power.

21. An engine according to claim 20, wherein a heat source is provided to increase the temperature of the exhaust gas driving the precompressor (27).

22. An engine according to claim 21, wherein the heat source is a burner.

23. An engine according to any one of claims 17 to 20, wherein the precompressor comprises two compressors (21, 27) connected in series, one of which (27) is driven by exhaust gas, and the other of which (21) is not.

24. An engine according to claim 23, wherein the one compressor (27) has a higher compression ratio than the other (21) compressor and wherein heat is recovered downstream of the one compressor.

25. An engine according to claim 24, wherein the one compressor (27) has a compression ratio of at least twice that of the other (21).

26. An engine according to claim 23, wherein the other compressor (21) is a rotary compressor.

27. An engine according to claim 26, wherein the rotary compressor (21) is a single-stage centrifugal compressor.

28. An engine according to claim 23, wherein the other compressor (21) is driven by a variable speed motor (22).

29. An engine according to claim 23, wherein the other compressor (21) is a variable geometry compressor.

30. An engine according to claim 29, wherein the other compressor (21) has variable inlet guide vanes.

31. An engine according to claim 20, wherein an intercooler (24) is provided to cool the air between the two compressors (21, 27) of the precompressor.

32. An engine according to claim 1, wherein an air pre-cooler (33) is provided to cool the air between the precompressor (21, 27) and the isothermal compressor (1).

33. An engine according to claim 1, wherein a spray of water is provided to cool the air prior to its entry into the isothermal compressor (1).

34. An engine according to claim 1, wherein the positive displacement isothermal compressor (1) is a reciprocating compressor in which a piston reciprocates in a cylinder to compress the air.

35. An engine according to claim 1, further comprising a storage chamber (60), means (61) to feed the compresses air from the isothermal compressor (1) to the storage chamber, means (61) to feed compressed air from the storage chamber to the combustion chamber (4), and a valve system (62, 63, 64) for selectively feeding compressed air from the isothermal compressor either to the storage chamber or to the combustion chamber, and for selectively feeding compressed air from the storage chamber to the combustion chamber.

36. An engine according to claim 35, wherein the isothermal compressor (1) and combustion chamber (4) are connected by a drive shaft (65) and wherein a motor/generator (68) is coupled to the shaft between a pair of clutches (66,67).

37. An engine according to claim 35 or claim 36, wherein a generator (71) is provided which is driven by exhaust gas from the engine and an independent power supply (22) is provided for the precompressor.

38. An engine according to claim 1, further comprising means to recover heat from a part of the engine and use the heat for a purpose external to the engine.

39. An engine according to claim 38, further comprising means to control the relative amounts of the power and heat for external use generated by the engine.

40. An engine according to claim 1, further comprising a bypass line (48A) transporting a proportion of the compressed air and/or the exhaust gas past the primary heat exchanger (4), and a by pass valve (48B) for controlling the flow through the bypass line.

41. An engine according to claim 1, wherein heat is recovered in the secondary heat exchanger from the exhaust gas from the combustion chamber (4).

42. An engine according to claim 38, wherein heat for the secondary heat exchanger is recovered from the exhaust gas (55) downstream of the precompressor.

43. An engine according to claim 38, wherein the primary heat exchanger (4) includes a number of flow paths connected to an external heating circuit.

44. A method of generating power, the method comprising compressing air in a positive displacement compressor (1); spraying liquid into the compressor as the air is compressed so that the compression is substantially isothermal; removing liquid from the compressed air; feeding the compressed air to a combustion chamber (4); injecting fuel; combusting the fuel and expanding the combustion gases in the combustion chamber to generate power; and feeding the exhaust gas from the combustion chamber to a primary heat exchanger (3) to heat the compressed air upstream of the combustion chamber; characterized by recovering heat from a part of the engine and transferring this heat to the compressed air from the isothermal compressor upstream of the primary heat exchanger.

45. A method according to claim 44, further comprising the step of compressing the air in a precompressor (27, 29) upstream of the positive displacement compressor (1), and wherein the step of recovering heat comprises recovering heat from the precompressor in a precompressor heat exchanger (31) and recovering heat from the combustion chamber (4) in a combustion chamber heat exchanger (45).

46. A method according to claim 45, further comprising the steps of splitting the air from the positive displacement compressor (1) into two streams (43, 44) and feeding one stream (43) to the precompressor heat exchanger (31) and the other stream (44) to the combustion chamber heat exchanger (45), and controlling the split of the air into the two streams.

47. A method according to claim 46, further comprising controlling the fraction of air directed to each stream by means of a look-up table which specifies the required air split as a function of the various inlet conditions to the precompressor heat exchanger (31) and combustion chamber heat exchanger.

48. A method according to claim 46 or 47, further comprising the step of supplying liquid to each of the two streams (43, 44) upstream of the respective heat exchangers (31, 45) and controlling the amount of liquid supplied to each stream.

49. A method according to claim 48, further comprising the steps of monitoring the temperature differential between the incoming and outgoing streams at the hot end of each of the precompressor and combustion chamber heat exchangers (31, 45), and controlling the water flow to each of the heat exchangers so as maintain the temperature differential at a desired level.

* * * * *